United States Patent
Han et al.

[19]

[11] Patent Number: 5,905,728
[45] Date of Patent: May 18, 1999

[54] METHOD OF ASSIGNING CONNECTION IDENTIFIER IN ASYNCHRONOUS TRANSFER MODE SWITCHING SYSTEM

[75] Inventors: Mi-Sook Han; Eon-Kyung Lee; Moon-Kyun Oh, all of Daejeon, Rep. of Korea

[73] Assignees: Electronics and Telecommunications Research Institute, Daejeon; Korea Telecommunication Authority, Seoul, both of Rep. of Korea

[21] Appl. No.: 08/763,254

[22] Filed: Dec. 10, 1996

[30] Foreign Application Priority Data

Jun. 19, 1996 [KR] Rep. of Korea ...................... 96-22453

[51] Int. Cl.⁶ .............................. H04L 12/28; H04L 12/56
[52] U.S. Cl. .......................... 370/395; 370/397; 370/399; 370/409
[58] Field of Search .................................... 370/388, 389, 370/395, 397, 399, 409, 410, 396, 398, 401, 404, 403

[56] References Cited

U.S. PATENT DOCUMENTS 5,323,389  6/1994  Bitz et al. ............................... 370/397
5,479,401  12/1995  Bitz et al. ............................... 370/399
5,689,500  11/1997  Chiussi et al. .......................... 370/388

FOREIGN PATENT DOCUMENTS 0523386  1/1993  European Pat. Off. .
2268359  1/1994  United Kingdom .
2285366  7/1995  United Kingdom .

*Primary Examiner*—Dang Ton
*Assistant Examiner*—Phirin Sam
*Attorney, Agent, or Firm*—Antonelli, Terry, Stout & Kraus, LLP

[57] ABSTRACT

A method of assigning a connection identifier for an asynchronous transfer mode switching system, includes the steps of: (a) analyzing a parameter transmitted in a VPI allocation request if it is received, analyzing the number of connections and the number of VPI used in SIM, and confirming whether a VPI desired to be used in VPI allocation request if the input parameter is normal and connection is available; (b) changing the usage state of VPI assigned to a VPI management table if the VPI is designated and this is in no use, increasing the number of VPI and the number of VPI assigned in the connection identifier management table, indicating a VPI assigned, or selecting a VPI in no use in SIM if the VPI is not designated with reference to the VPI management table, and changing the usage state of the VPI assigned in the VPI management table.

31 Claims, 11 Drawing Sheets

| IMNo (11) | VPINum (12) | VPCcnt (13) | VCCcnt (14) |
|---|---|---|---|
| 0 | 4 | 3 | 5 |
| 1 | 1 | 0 | 512 |
| . | . | . | . |

(B)

| IndexNo (15) | Usage_Sts (16) | HeadConvType (17) | VCCcnt (18) | NextVCINo (19) |
|---|---|---|---|---|
| 0 | TRUE | vc | 10 | 43 |
| 1 | FALSE | — | 0 | 32 |
| 2 | TRUE | vp | 0 | — |
| . | . | . | . | . |

(C)

| IMNo (20) | VPI (21) | VCI (22) |
|---|---|---|
| 0 | 255 | 65535 |
| . | . | . |
| 1 | 0 | 32 |
| . | . | . |
| . | . | . |
| 31 | 5 | 1000 |
| . | . | . |

METHOD OF ASSIGNING CONNECTION IDENTIFIER IN ASYNCHRONOUS TRANSFER MODE SWITCHING SYSTEM

BACKGROUND OF THE INVENTION

1. Field of the Invention

The present invention relates to a method of assigning connection identifiers for virtual path connection (VPC) and virtual channel connection (VCC) in an asynchronous transfer mode (ATM).

2. Discussion of Related Art

Connection identifiers (VPI/VCI) are used to discriminate the connection between a subscriber and networks in an ATM switching system. Subscriber interfacing includes digital signal level 1 European (DS1E) supporting 2.048 Mbps, digital signal level 3 (DS3) supporting 44.736 Mbps, synchronous transport module 1 (STM1) supporting 155 Mbps, and STM4 supporting 622 Mbps.

According to the type of subscriber link connected in subscriber interface module (SIM), one subscriber link is interfaced in SIM for STM1, 3 for DS3, and 72 for DS1E. In ITU-T Q.2931 recommending interfacing between the subscriber and network for wideband service, the range of VPI for every subscriber interface is regulated to be within 0–255, the range of VCI inside the VP within 32–65535.

An existing N-ISDN switching system allows a limited number of channels inside the physical link between the subscriber and network. For instance, 2B+D interface has two channels transmitting user data so that only if they are discriminated is the subscriber data easily distinguished. Therefore, interfacing between subscriber and network is simply performed so that channel number allocation is managed only by indicating one being in use.

In B-ISDN switching system employing ATM, information for multiple connections is multiplexed because the broadband offered by one physical link is above 155 Mbps. Here, a connection identifier for discriminating user information is used, whose range is eight bits for VPI, and 16 bits for VCI.

In the ATM switching system, the range of connection identifiers available is wide so that it is almost impossible to indicate whether it is used or not, for every subscriber link. For this reason, contrary to the conventional method, the identifier cannot be limited to a predetermined range of values between subscriber and network when the subscriber link is installed.

SUMMARY OF THE INVENTION

Accordingly, the present invention is directed to a method of assigning a connection identifier in an ATM switching system that substantially obviates one or more of the problems due to limitations and disadvantages of the related art.

An object of the present invention is to provide a method of assigning a connection identifier in an ATM switching system in which VPI is managed by index to thereby assign as many connection identifiers as a permissible number of connections for every SIM, in which a virtual path connection is enabled only with VPI, and in which the VPI assigned for the virtual path connection is not taken as a connection identifier for virtual channel connection so that user information transmitted by connection identifiers does not collide.

Additional features and advantages of the invention will be set forth in the description which follows, and in part will be apparent from the description, or may be learned by practice of the invention. The objectives and other advantages of the invention will be realized and attained by the structure particularly pointed out in the written description and claims as well as the appended drawings.

To achieve these and other advantages in accordance with the purpose of the present invention, as embodied and broadly described, herein there is provided a method of assigning a connection identifier for an asynchronous transfer mode switching system, the method comprising the steps of: (a) analyzing a parameter transmitted in a connection identifier allocation request when it is received, analyzing the number of connections in SIM, and confirming a signalling mode between subscriber and network if the input parameter is normal and connection is available; (b) calculating an index value for accessing a VPI management table which stores a VPI usage state if the signalling mode is a coupled signalling mode in which only the same VPI for signalling is used as VPI for user data transmission, VPI or both VPI and VCI are designated in connection identifier allocation request, and the VPI for signalling and the VPI for user data transmission are identical, to thereby check the usage stage of a detected VPI; (c) designating the VPI for user data transmission as the VPI for signalling if the signalling mode is a decoupled signalling mode in which the VPI for signalling and other VPIs are available for VPI for user data transmission, and VPI or both VPI and VCI are not designated, and calculating an index value for accessing the VPI management table which stores a VPI usage state it there is no error in the designated VPI, to thereby check the usage stage of the detected VPI; (d) notifying a connection identifier allocation failure if the VPI is used for virtual path connection, notifying that the virtual path is already established if the VPI is used for a virtual channel, or analyzing the signalling mode if the VPI is not in use; (e) indicating that the VPI selected is in use if the signalling mode is the non-associating mode and the number of VPI used does not surpass the number of VPI assigned to the VPI connection identifier allocation number management table; and (f) indicating that the VPI selected is in use if the signalling mode is the associating mode and a new VPI can be used.

In another aspect of the present invention, there is provided a method of assigning a connection identifier for an asynchronous transfer mode switching system, the method comprising the steps of: (a) analyzing a parameter transmitted in a VPI allocation request when it is received, analyzing the number of connections and the number of VPI used in SIM, and confirming whether a VPI desired to be used in VPI allocation request if the input parameter is normal and connection is available; (b) changing the usage state of VPI assigned to a VPI management table if the VPI is designated and is not in use, increasing the number of VPI and the number of VPI assigned in the connection identifier management table, indicating an assigned VPI, or selecting a VPI in no use in SIM if the VPI is not designated with reference to the VPI management table, and changing the usage state of the VPI assigned in the VPI management table.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

In the drawings:

FIGS. 3A, 3B and 3C are management tables for connection identifier allocation according to the present invention;

DETAILED DESCRIPTION OF PREFERRED EMBODIMENT

Reference will now be made in detail to the preferred embodiments of the present invention, examples of which are illustrated in the accompanying drawings.

Figure 1:
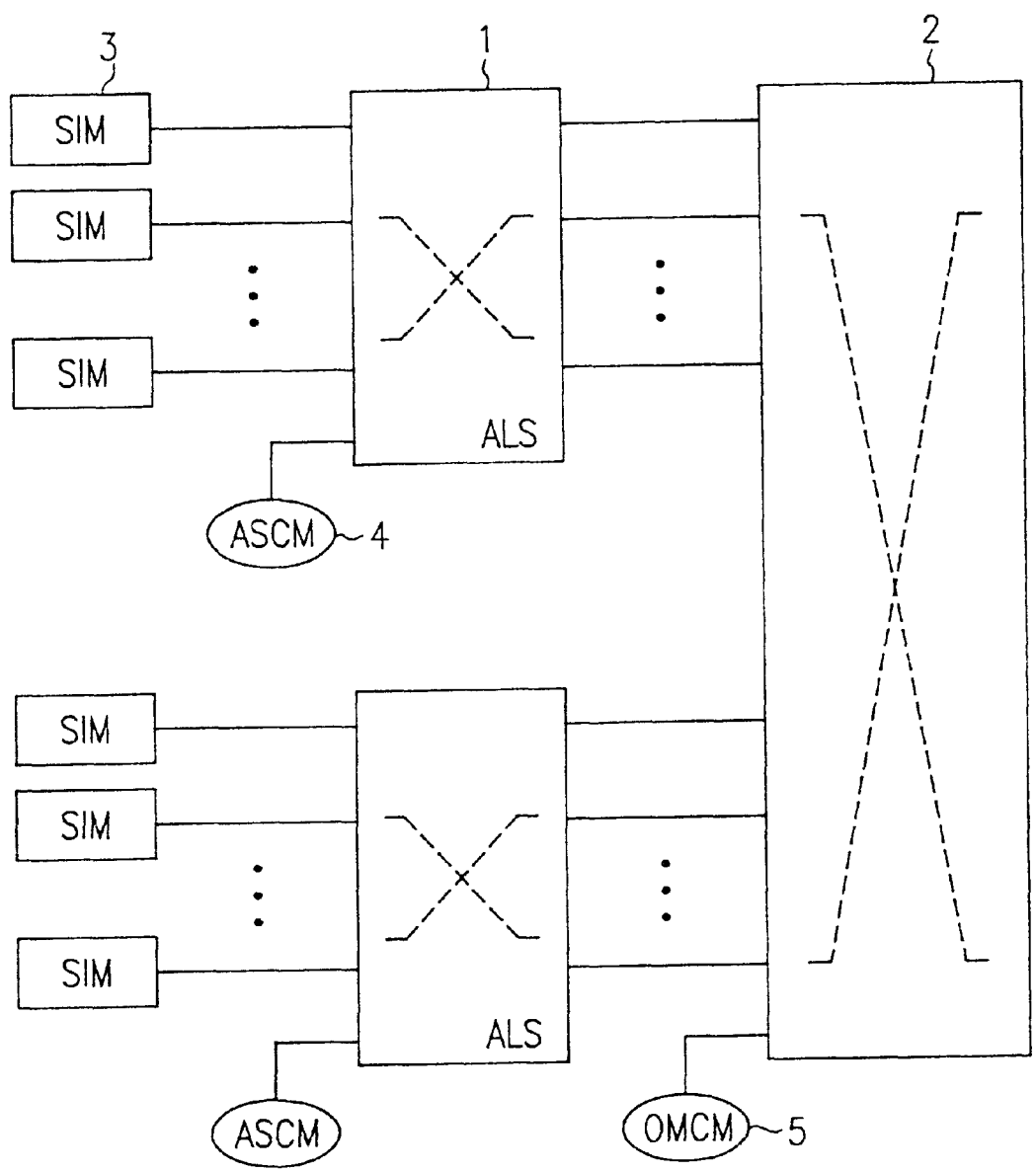
FIG. 1 is a schematic architecture of an ATM switching system to which the present invention will be applied.

In FIG. 1, reference numeral 1 represents ATM local switching subsystem (ALS). Reference numeral 2 is an ATM central switching subsystem (ACS). Reference numeral 3 is a subscriber interface module (SIM). Reference numeral 4 is an access switching control module (ASCM). Reference numeral 5 is an operation & maintenance control module (OMCM). An ATM switching system is divided into independent ALSs (1), which are connected with ACS 2.

ALS 1 includes SIM 3 for performing cell transmission/reception between subscriber and network, and ASCM 4 for controlling subscriber call and connection. ACS 2 has OMCM 5 for performing operator interfacing and system operation and maintenance.

Figure 2:
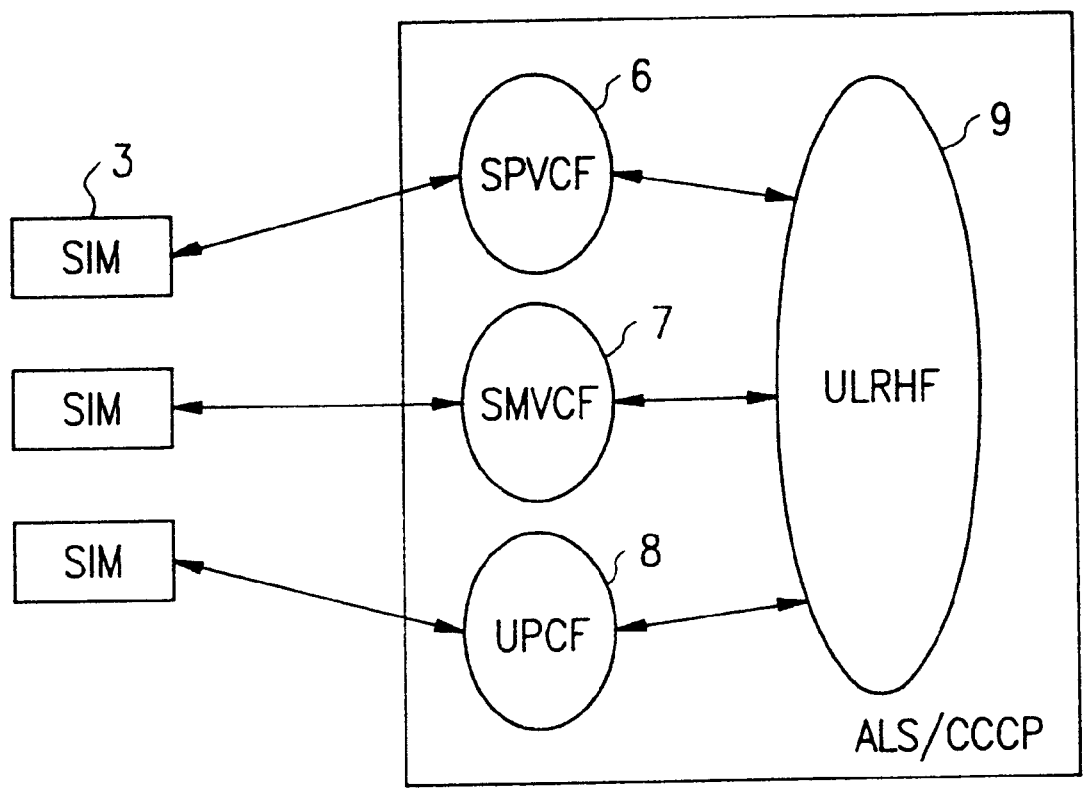
FIG. 2 is a block diagram of software function for connection identifier allocation.

Referring to FIG. 2, a software function block for connection identifier allocation is incorporated in the call connection control processor (CCCP) of the ALS. Semi-permanent PtP virtual connection control function (SPVCF) block 6 controls point-to-point exclusive line service required from management plane function.

Semi-permanent PtMP virtual connection control function (SMVCF) block 7 controls point-to-multipoint exclusive line service required from the management plane function. User protocol control function (UPCF) block 8 controls the subscriber call according to the transmission/reception of Q.2931 message with a subscriber terminal.

After the function of assigning a connection identifier necessary for connection by SPVCF 6, SMVCF 7 and UPCF 8, UNI link resource handling function (ULRHF) block 9 performs call processing library, as a block performing the present invention. SIM 3 receives information for connection from SPVCF 6, SMVCF 7 and UPCF 8 in order to transmit or receive subscriber information cell.

FIG. 3A shows a management table of the number of connection identifiers assigned to interfacing modules. FIG. 3B shows a management table of VPI. FIG. 3C shows a management table of VCI. The elements of the table of the number of connection identifiers assigned to interfacing modules are as follows.

IMNo 11 is the SIM number, having one byte of integer. The maximum number of SIM 3 is determined by the switch architecture of ALS 1. When a switch is 32×32, 31 SIMs are ensured for every ALS 1 because SIM 3 can be connected to 32 ports excluding one port for connecting ASCM 4.

VPINum 12 is the number of VPI assigned to SIM 3, having a value between 0 and 127 from one byte of integer. The maximum number of VPI permissible inside SIM 3 is 128.

VPCcnt 13 is the number of virtual path connection assigned to SIM 3, having a value between 0 and 127 from one byte of integer. The maximum number of permissible virtual connections in SIM 3 is 128.

VCCcnt 14 is the number of virtual channel connections assigned to SIM 3, having a value between 0 and 511 from one byte of integer. The maximum number of virtual channel permissible connections in SIN 3 is 512. The management table of FIG. 3A stores the number of VPI, the number of virtual path connections, and the number of virtual channel connections, all being in use. If the virtual path connection is set, then VPCcnt 13 and VPINum 12 both increase by 1. If the virtual channel connection is set, then VCCcnt 14 increases by 1.

If the virtual path identifier assigned for virtual channel connection is newly assigned but not used for virtual channel connection, then VPINum 12 increases by 1. If the virtual path connection is released, then VPCcnt 13 and VPINum 12 both decrease by 1. If the virtual channel connection is released, then VCCcnt 14 decreases by 1.

If there is no other virtual path connection in a VPI to which the released virtual channel connection belongs, then VPINum 12 decreases by 1, and Usage_Sts 16 of the VPI management table of FIG. 3B is changed into TRUE. The elements of the VPI management table are shown as below.

IndexNo 15 is an index key for accessing the VPI management table, having four bytes. It is calculated with IMNo 11×256 (range of maximum VPI in interface module)+VPI number to be assigned. If there are 31 interface modules, the maximum IndexNo is 7935.

Usage_Sts 16 indicates whether the VPI is in use or not. If the value is FALSE in Boolean type, the VPI is indicated to be in use, and vice versa.

HeadConvType 17 is information indicative of whether the VPI is assigned for virtual path connection or for virtual channel connection, having one byte of set type. The information being stored for VP indicates virtual path. The case for VC indicates virtual channel.

VCCcnt 18 is the number of virtual channel connections assigned to VPI of SIM 3, having a value between 0 and 511 from one byte of integer.

NextVCINo 19 is VCI to be next assigned in VPI, having four bytes between 32 and 65535.

The VPI management table enables one approach by calculating IndexNo 15 in order to know whether or not a VPI is used in SIM. In addition, the time to assign a connection identifier can be reduced by maintaining a next-assigned NextVCINo 19 when a VCI is to be assigned in VPI. Whether or not the VPI is used is managed by SIMs. With the allocation and release of VPI, IndexNo 15 is calculated. With reference to the table with the IndexNo calculated, in case of VPI allocation, Usage-Sts 16 is defined as FALSE. In case of VPI release, it is set as TRUE. If the VPI assigned is to be used for virtual path connection, HeadConvtype 17 is stored as VP, but if it is to be used for virtual channel connection, it is stored as VC. For VPI in which HeadConvType 17 is VC, it can be used as a VPI for virtual channel connection. Here, the selection of VCI not used is made easy by storing the number of virtual channel connections within a virtual path in VCCcnt, and storing a VCI assigned next in NextVCINo 19. Finally, the elements of the VCI management table are as follows.

IMNo 20 is the SIM number, having one byte of integer. The maximum number of SIM 3 is determined by the switch architecture of ALS 1. When a switch is 32×32, 31 SIMs are ensured for every ALS 1 because SIM 3 can be connected to 32 ports excluding one port for connecting ASCM 4.

VPI 21 is a virtual path identifier assigned for virtual channel connection, having two bytes between 0 and 255.

VCI 22 is a virtual channel identifier of the VPI assigned for virtual channel connection, having four bytes between 32 and 65535.

The VCI management table manages VPI 21 and VCI 22 used by virtual channel connections set by SIMs. VPI/VCI assigned in setting virtual channel connection is stored in SIM number area to which the connection belongs. In case of virtual channel connection release, the stored VPI/VCI is erased.

The management table is characterized in that it includes as many tables as the number of connections permissible by SIMs×the number of SIMs. In accessing the table, the number of accessing table in the worst case can be reduced by applying IMNo as the table index. In addition, the time of access can be minimized by accessing only tuple not −1 in table access. This is accomplished by storing −1 as the value of memory not storing its contents yet and packing it. A tuple having −1 is selected when a new VPI/VCI is assigned and then input to the table so that the selection of memory is made easy.

Figure 4A:
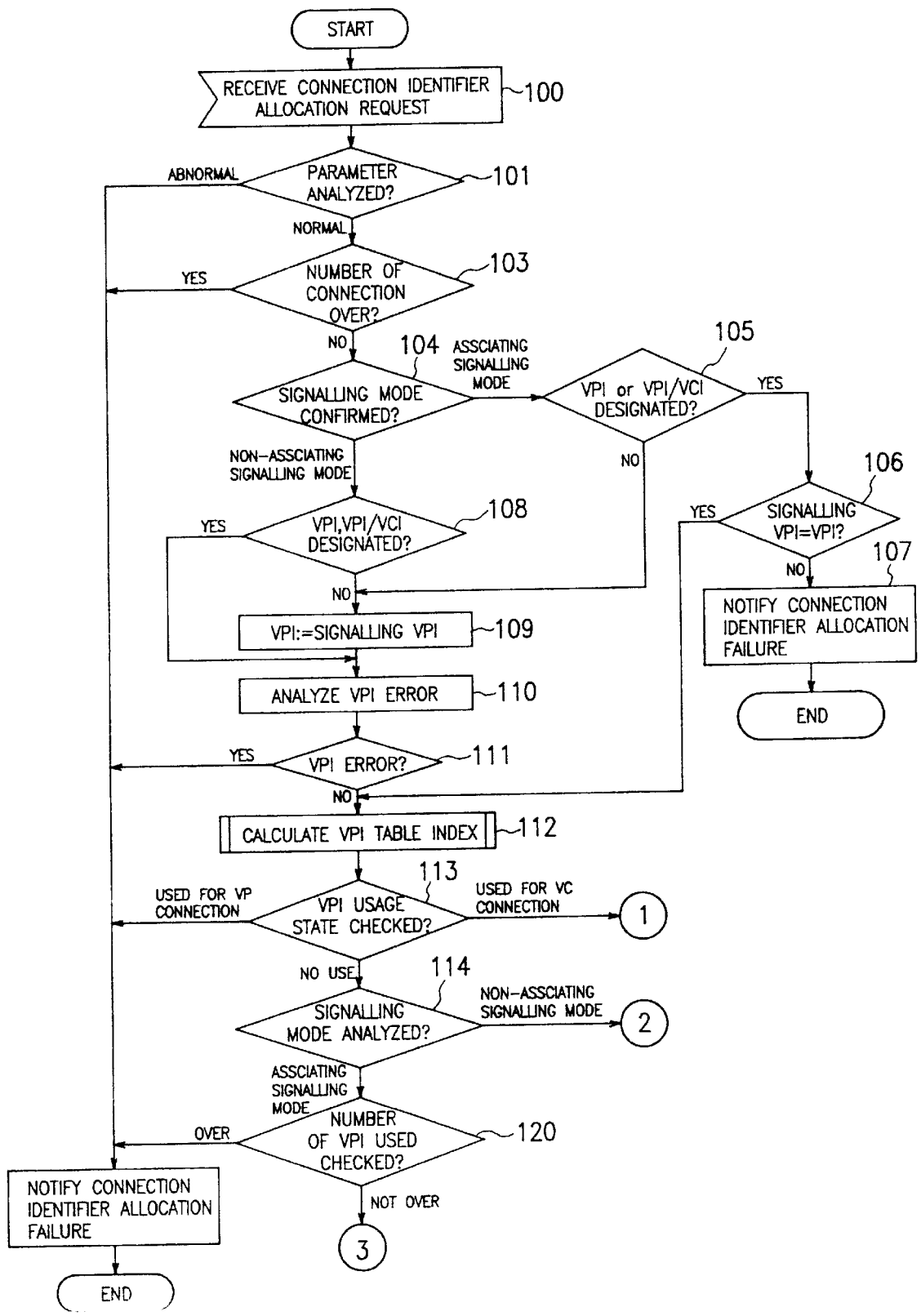
FIGS. 4A and 4B are flowcharts for assigning connection identifiers for virtual channel connection according to the present invention.
Figure 4B:
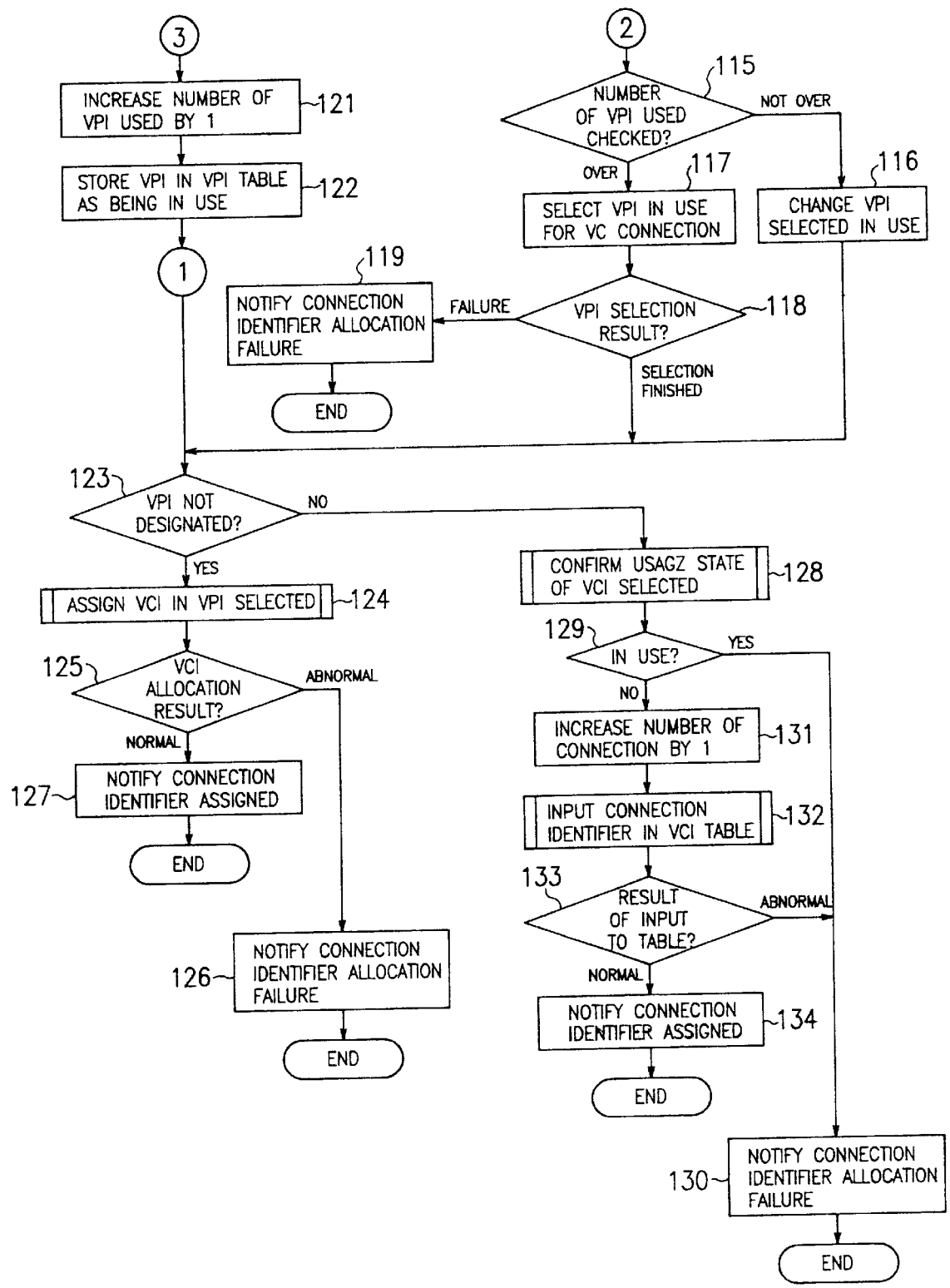

Referring to FIGS. 4A and 4B, when ULRHF block 9 receives a connection identifier allocation request from SPVCF 6, SMVCF 7 and UPCF block 8, IMNo 11, parameters such as signalling mode designation information, signalling VPI are analyzed in step 101. If they are determined to be abnormal, connection identifier allocation impossibility is informed to the block for setting call and connection in step 102, and the step ends.

If the parameters are normal, the number of connection in SIM required to assign connection identifier is analyzed in step 103 by using VPCcnt 13 and VCCcnt 14 of FIG. 3. If the number of connection surpasses a predetermined value allowable value, connection identifier allocation impossibility is informed to the block for setting call and connection in step 102, and the step ends.

If the connection is allowable in step 103, the signalling mode between subscriber and network required when a VPI number is selected in connection identifier allocation is analyzed in step 104. When a coupling mode in which only the same VPI for signalling is used for VPI for user data transmission, it is determined in step 105 whether the VPI or both VPI and VCI are designated.

According to the analysis result in step 105, if they are not designated, the VPI for user information transmission is designated as the VPI for signalling in step 109. If they are designated, it is determined in step 106 whether the VPI for signalling and the VPI for user data transmission are identical. If they are not identical, connection identifier allocation impossibility is informed to the block for setting call and connection in step 107. If the VPI for signalling and the VPI for user data transmission are the same, IndexNo 15 for accessing VPI management table b of FIG. 3 where the usage state of VPI is stored is calculated in step 112.

The signalling mode between subscriber and network is analyzed in step 104. If the mode is a non-associating mode which allows signalling VPI and other VPIs for user data transmission, it is determined in step 108 whether VPI or both VPI and VCI are designated.

According to the result of analysis in step 108, if they are not designated, the VPI for user information transmission is designated as the VPI for signalling in step 109, and then the error of VPI designated for user information transmission is analyzed in step 110 as when they are designated, to thereby decide whether there is an error in VPI in step 111.

If there is a false VPI, connection identifier allocation failure is informed to the block for setting call and connection in step 102. If there is no false VPI, IndexNo 15 for accessing VPI management table b of FIG. 3 where the usage state of VPI is stored is calculated in step 112.

The usage state of VPI detected with the calculated IndexNo 15 as a key is checked in step 113. If the VPI is used for virtual path, connection identifier allocation impossibility is informed to the block for setting call and connection in step 102 because the VPI cannot be used for VPI for VC connection. When VPI is already used for VC connection, a procedure following the step 123 for finding out whether the VCI is not designated is performed including the step. When VPI is not in use, the signalling mode is analyzed in step 114.

In case of non-associating signalling mode, the number of VPI in use in SIM is checked in step 115. If the number does not surpass a permissible value, the VPI selected is changed to be in use in step 116, and it is determined in step 123 whether or not the VCI is designated. If the number of VPI surpasses its limit in SIM, one of VPI being used for VC connection in SIM is selected in step 117, and the selection result of VPI is analyzed in step 118. If the VPI selection fails, connection identifier allocation impossibility is informed to the block for setting call and connection in step 119. If the selection is finished, it is determined in step 123 whether the VCI is not designated.

In case of associating signalling mode, the number of VPI being used in SIM is analyzed in step 120 with reference to VPINum 12 of connection identifier allocation number management table a of FIG. 3. According to the result of analysis in step 120, if the use of a new VPI is not permitted, connection identifier allocation impossibility is informed to the block for setting call and connection in step 102. If a new VPI is allowable, VPINum 12 of connection identifier allocation number management table a of FIG. 3 increases by 1 in step 121, and Usage_Sts 16 corresponding to IndexNo 15 of VPI management table b of FIG. 3 is determined to be FALSE. Then, HeadConvType 17 is designated as VC, VCCcnt 18 as 0, and NextVCINo 19 as 32. The VPI is stored to be in use in step 122, and then it is determined in step 123 whether the VCI is not designated.

The step of assigning VCI is carried out in such a manner that the VCI value is designated, and it is determined in step 123 whether or not the connection identifier allocation is required. If the value is not designated, the VCI of VPI selected is assigned in step 124. When VCI allocation fails according to the result of allocation in step 125, connection identifier allocation failure is informed to the block for setting call and connection in step 126. If the VCI allocation is normal, the VPI/VCI assigned is informed to the block for setting call and connection in step 127, and the step ends.

If the VCI is designated in step 123 in connection identifier allocation request, it is confirmed in step 128 whether or not the VCI selected is in use. If the VCI is in use in step 129, allocation impossibility is informed to the block for setting call and connection in step 130 because the connection identifier required for allocation is in use. If the VCI is not in use in step 129, the VCCcnt 14 of connection identifier allocation number management table a and VCCcnt 18 of VPI management table b of FIG. 3 increase by 1 in step 131, and the connection identifier selected is stored in the VCI management table in step 132.

If the storage result ends abnormally in step 133, connection identifier allocation impossibility is informed to the block for setting call and connection in step 130. If the storage is normal, the connection identifier assigned is informed to the block for setting call and connection in step 134.

Figure 5:
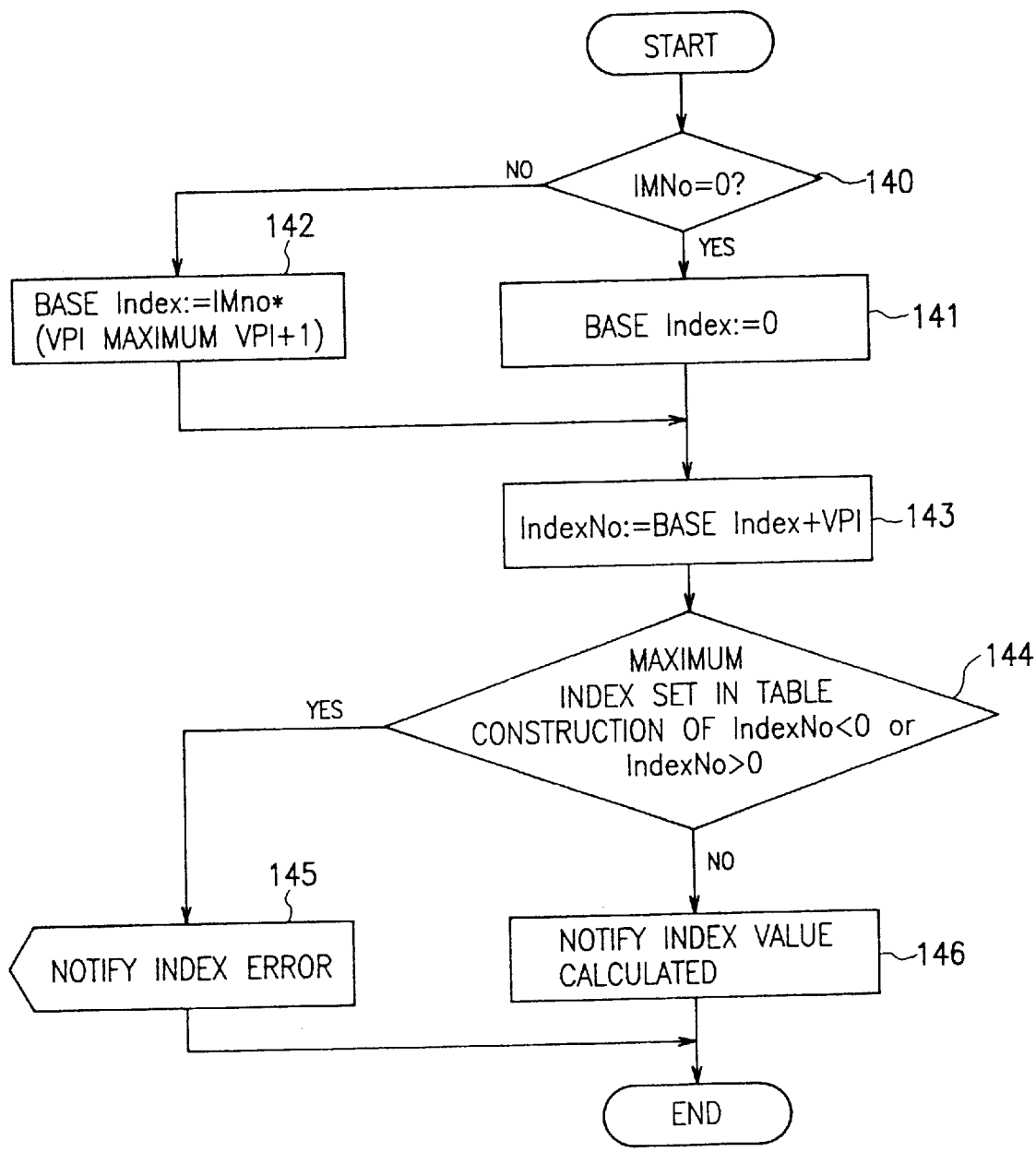
FIG. 5 is a flowchart for calculating index values of the VPI managing table according to the present invention.

Referring to FIG. 5, it is determined in step 140 whether IMNo is 0 or not. If IMNo is 0, base index value Base_Index is stored as 0 in step 141. If IMNo is not 0, for the base index value, a value in which IMNo is multiplied by the maximum VPI value MAX_VPI_VAL +1 of the subscriber link is stored in step 142. IndexNo is calculated in step 143 by adding the VPI required for index calculation to the base index value Base_Index stored, and the range of the calculated index value is checked in step 144.

If the calculated index value is smaller than 0 but greater than the maximum index value set in table configuration, index error INDEX_ERR is informed in step 145. If the calculated index value is not smaller than 0 but smaller than the maximum index value set in table configuration, the calculated index value is informed in step 146, and the step ends.

Figure 6A:
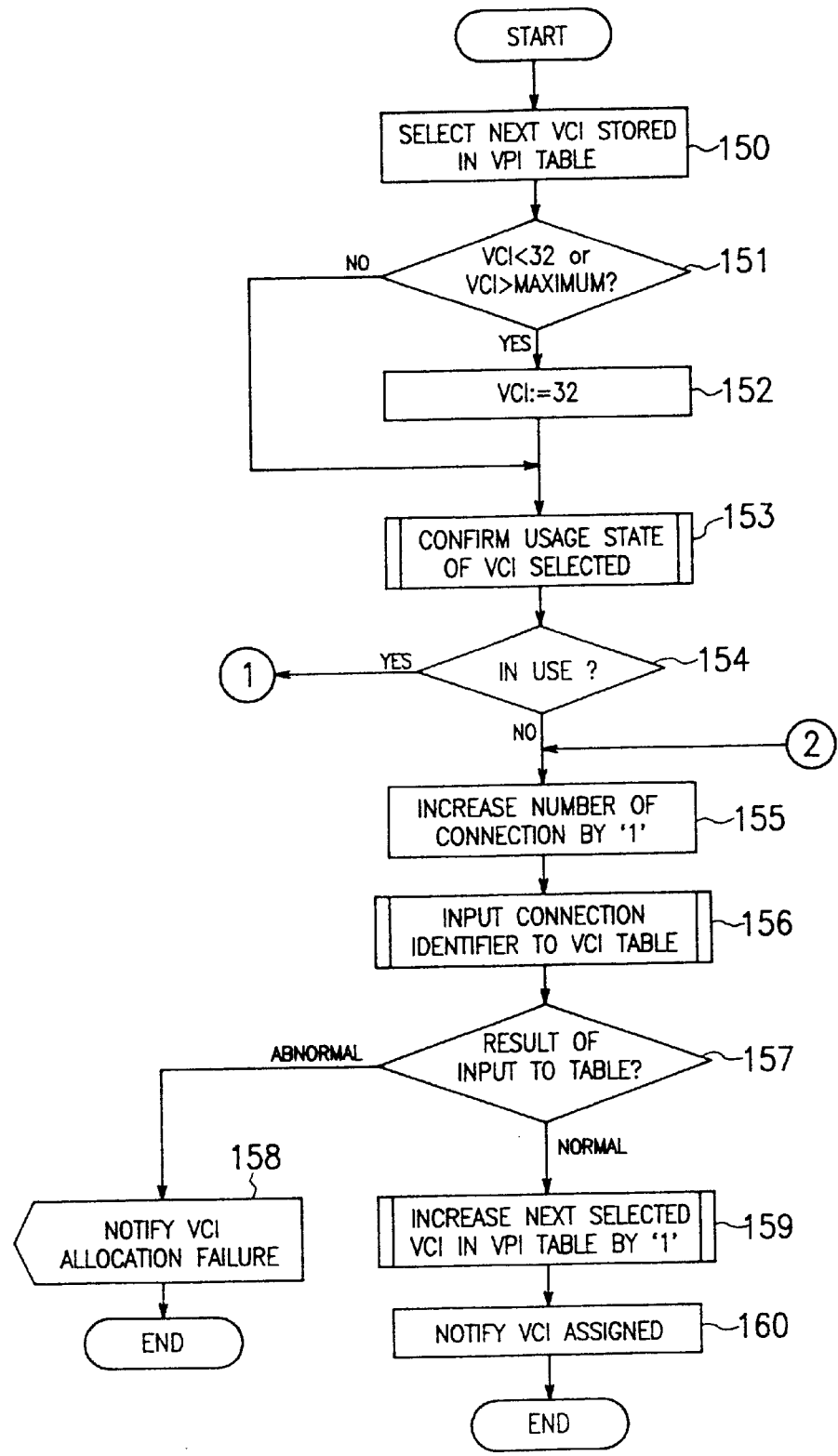
FIGS. 6A and 6B are flowcharts for assigning VCI inside VPI selected according to the present invention.
Figure 6B:
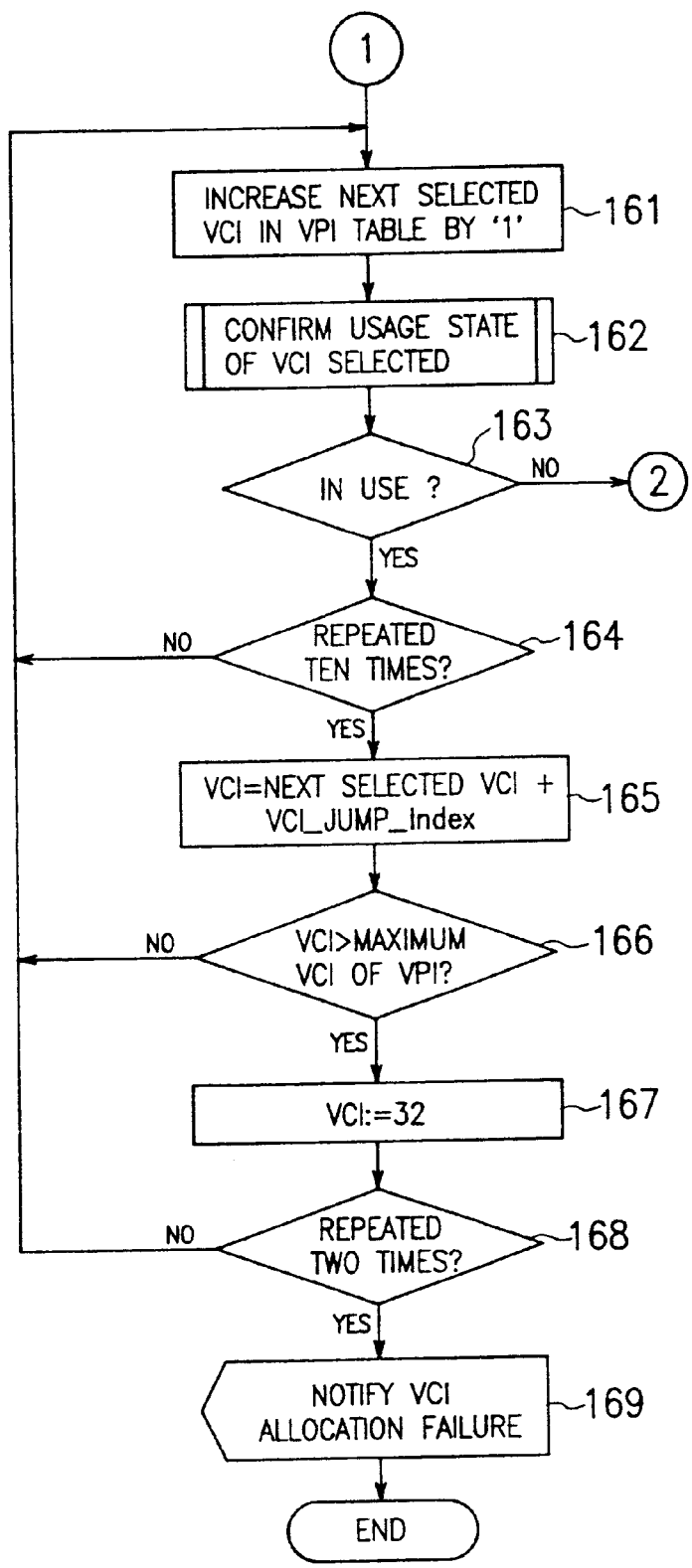

Referring to FIGS. 6A and 6B, a next VCI value NextVCINo 19 stored in the VPI management table is selected in step 150, and then the range of VCI selected is checked in step 151. If the selected VCI is smaller than 32 but greater than 65535, the maximum VCI value of VPI, 32 is selected as the VCI value in step 152. If the selected VCI is greater than 32 but smaller than 65535, the maximum VCI value of VPI, the usage state of the VCI value selected is confirmed with reference to the VCI management table in step 153.

If the VCI is not in use in step 154, the VCCcnt of the connection identifier allocation number management table a and VPI management table b increases by 1 in step 155, and connection identifier VPI/VCI selected is stored in the VCI management table in step 156.

If the storage result is abnormal in step 157, VCI allocation failure is informed in step 158. If the storage is performed normally, NextVCINo 19, a next selected VCI value stored in the VPI management table, increases by 1 in step 159, and the VCI assigned is informed in step 160.

If the selected VCI is in use in step 154, NextVCINo 19 of the VPI management table for selecting usable VCI in the VPI selected increases by 1 in step 161, and the usage state of VCI increased is confirmed in step 162. If the VCI is not in use, a procedure following the step of increasing by 1 VCCcnt of connection identifier allocation number management table a and VPI management table b is performed. If the VCI is in use, a procedure following the step of increasing by 1 NextVCINo 19 of the VPI management table in order to select usable VCI is performed ten times in step 164. If the usable VCI is not selected despite ten performances, a value in which an index value VCI_JUMP_INDEX for jumping the next selected VCI is added thereto when the selected VCI is in continuous use is selected as the VCI in step 165, and it is determined in step 166 whether the range of the VCI surpasses a predetermined value.

If the VCI selected is greater than 65535, the maximum VCI, the VCI is designated at 32 in step 167. If this process is not performed more than two times in step 168, a procedure following the step 161 of increasing by 1 NextVCINo 19 of the VPI management table in order to select usable VCI is performed repeatedly. If the VCI selected is smaller than 65535, the maximum VCI of VPI, a procedure following the step 161 of increasing by 1 NextVCINo 19 of the VPI management table in order to select usable VCI is performed repeatedly. If a usable VCI is not found in spite of at least two performances in step 168, VCI allocation failure is informed in step 169.

Figure 7:
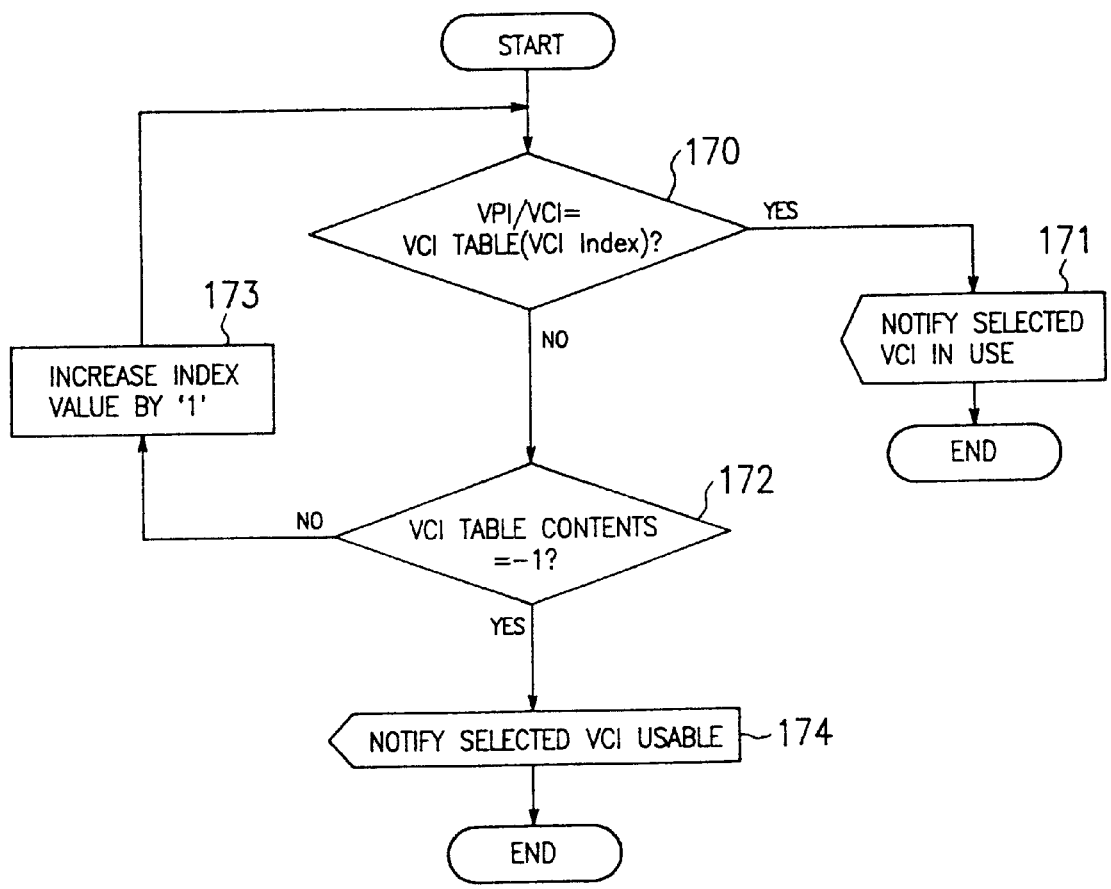
FIG. 7 is a flowchart for checking the usage state of VCI selected according to the present invention.

Referring to FIG. 7, the usage state of VCI is repeatedly performed as many as the number of connections currently set in SIM in order to find out whether the VPI/VCI selected is input in the VCI management table while in use. If the VPI/VCI selected is identical with the VPI/VCI corresponding to the VCIIndex stored in the VCI management table in step 170, it is informed in step 171 that the VCI selected is in use, and the step ends.

If they are not identical, the index value increases by 1 in step 173 when the value stored in the VCI management table is not −1, the final tuple, in order to the value corresponding to the next index value. Then, a procedure following the step 170 of analyzing whether the VPI/VCI selected is identical with the VPI/VCI corresponding to the VCIIndex stored in the VCI management table is performed repeatedly. If the value stored in the VCI management table is the final tuple in step 172, it is informed in step 174 that the VCI selected is usable, and the step ends.

Figure 8:
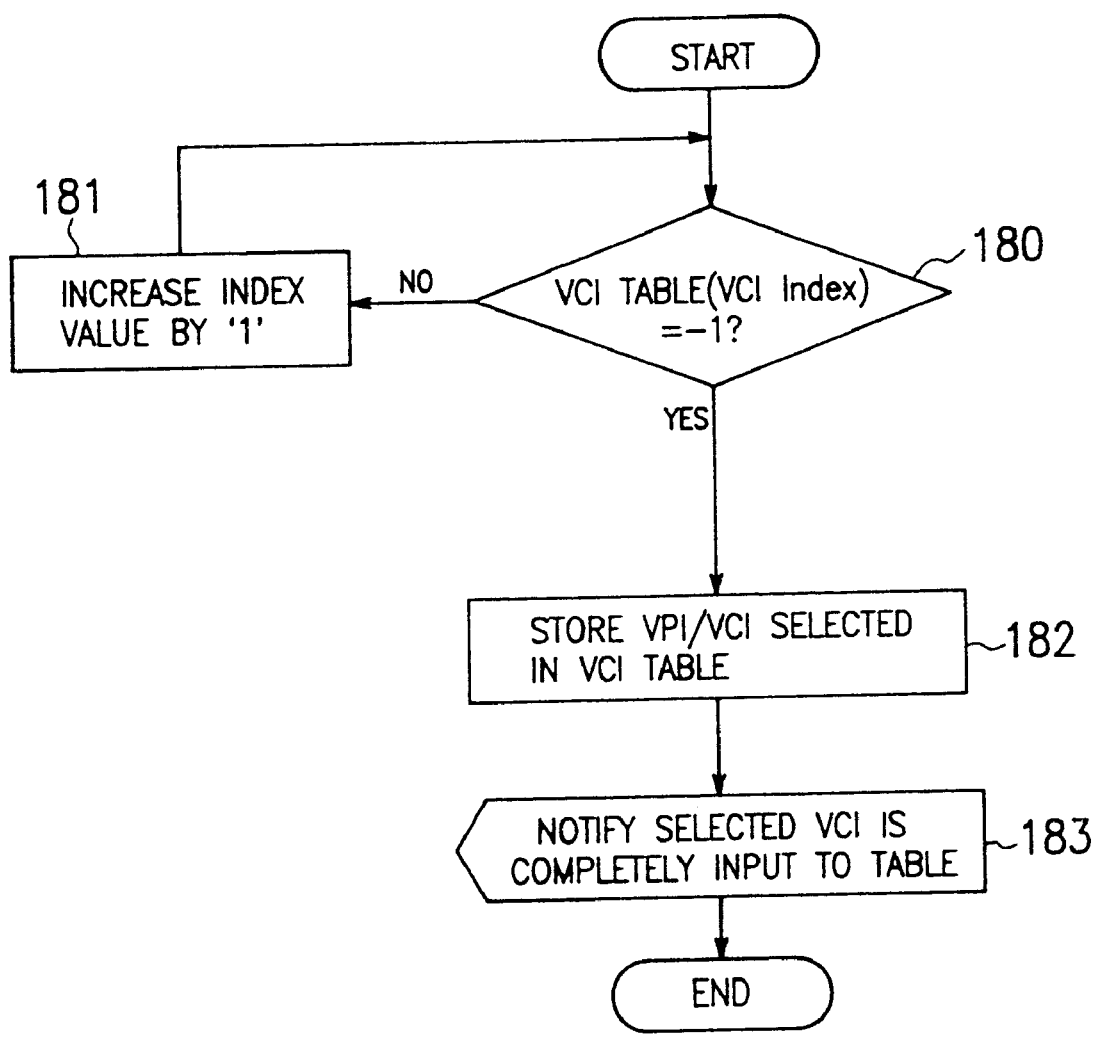
FIG. 8 is a flowchart for inputting a selected connection identifier to the table according to the present invention.

Referring to FIG. 8, a VPI/VCI is stored which is searched until the VPI 21 and VCI 22 of the VCI management table are −1, the final tuple, by taking the IMNo as the index. More specifically, it is determined in step 180 whether the VPI and VCI of the VCI management table are −1. If they are not −1, the index value increases by 1 in step 181. Then the step 180 of deciding whether the VPI and VCI of the VCI management table are −1 is performed repeatedly. If they are −1, the VPI/VCI selected is stored in the buffer of the VCI management table in step 182, and it is informed in step 183 that the VPI/VCI selected is completely input.

Figure 9:
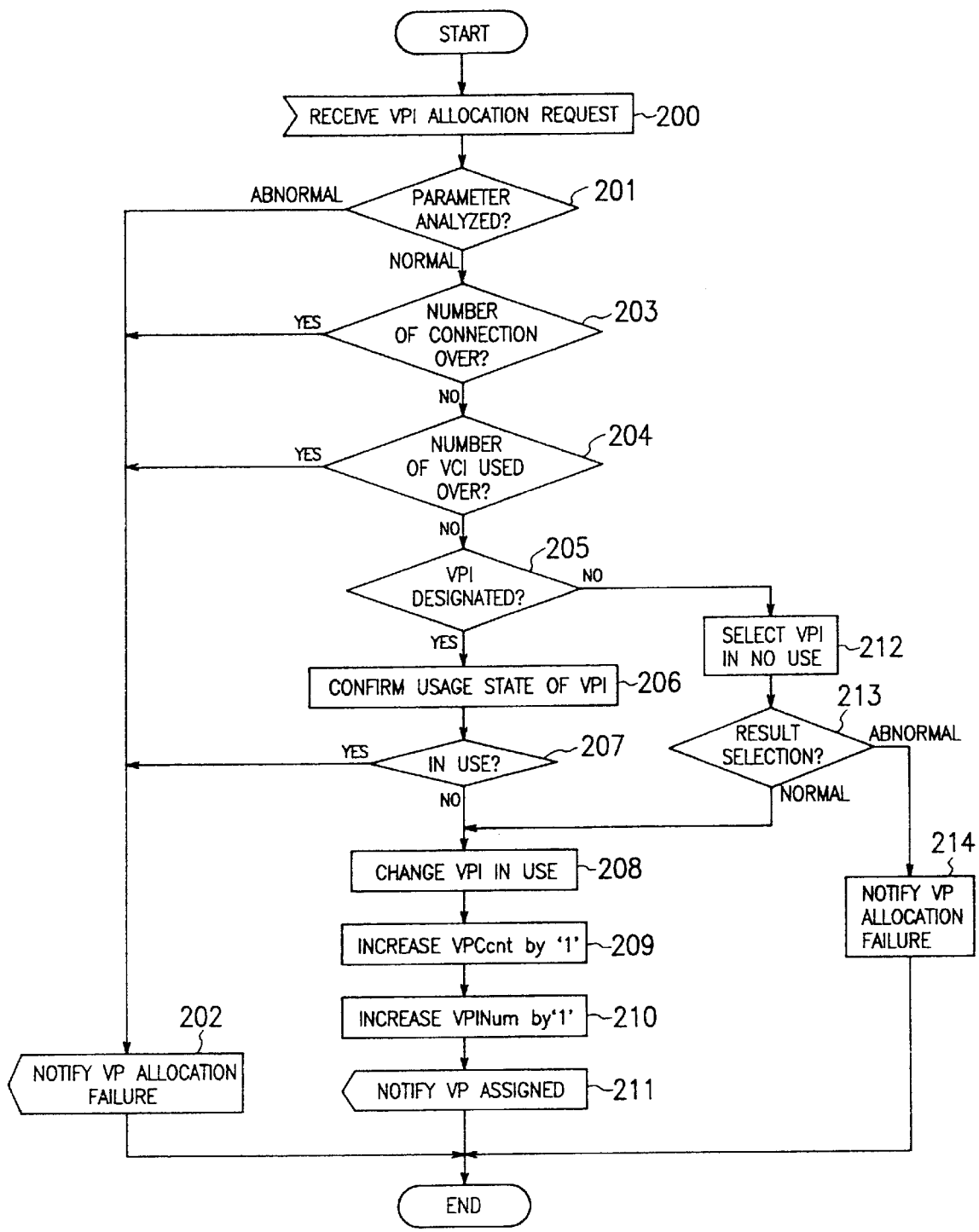
FIG. 9 is a flowchart for assigning VPI for virtual path connection.

Referring to FIG. 9, the VCI may be assigned after the allocation of VPI, but the allocation of VCI will not be described in the description of the present invention.

According to the step of assigning VPI, if a VPI allocation request is received from the SPVCF 6, SMVCF 7 and UPCF 8 for performing semi-permanent connection, in step 200, IMNo 11 transmitted in allocation request and, if the VPI is designated, a parameter indicative of whether the designated VPI is within a normal range are analyzed in step 201. If the result of analysis is abnormal, connection identifier allocation impossibility is informed to the block for semi-permanent connection in step 202, and the step ends.

If the result of analysis is normal, the number of connections in SIM required for VPI allocation is analyzed with reference to VPCcnt 13 and VCCcnt 14 of connection identifier allocation number management table a in step 203. If there are no more connections available, VPI allocation impossibility is informed in step 202 to the block of semi-permanent connection. If there is another connection available, the number of VPI in use in SIM required to assign to virtual path is analyzed with reference to the VPINum 12 of the connection identifier management table in step 204.

If the number of used VPI surpasses its limit, VPI allocation impossibility is informed in step 202. If not, it is determined in step 205 whether or not a VPI desired to be used in VPI allocation request is designated. If the VPI is designated, the usage state of the VPI designated is analyzed in step 206. If the VPI is in use, VPI allocation impossibility is informed in step 202. If the VPI is not in use, the usage state of the VPI assigned in the VPI management table is changed. Usage_Sts 16 is stored as FALSE, HeadConvType 17 as VP, and VCCcnt 18 as 0 in step 208. VPCCnt 13 of the connection identifier management table increases by 1 in step 209, and VPINum 12 increases by 1 in step 210. Then, the assigned VPI is informed to the block for semi-permanent connection in step 211, and the step ends.

If the VPI is not designated, a VPI not in use in SIM is selected with reference to the VPI management table in step 212, and if the selection of VPI fails, VPI allocation impossibility is informed in step 214. If the selection is normal, a procedure following the step 208 of changing the usage state of the VPI assigned of the VPI management table is performed.

In this invention as many connection identifiers as the number of connections permissible per SIM are assigned, a virtual path connection is enabled only with assigned VPI, and a virtual channel connection is enabled only with assigned VPI. In addition, the collision of user information transmitted by connection identifiers is eliminated because the VPI assigned for virtual path connection is not assigned for virtual channel connection. The entire range of connection identifiers recommended by ITU-T can be used so that there is no limit in the range of connection identifiers in subscriber terminal connection in accordance with the ITU-T recommendation. Further, the connection identifier management mode for assigning connection identifier is formed with index table so that it can be decided whether to use the VPI only with once selection, and thus the time to assign connection identifier can be minimized. According to management mode of the connection identifier assigned per subscriber link, the number of memories is reduced by setting as many memories as the number of connection permissible in the subscriber link.

It will be apparent to those skilled in the art that various modifications and variations can be made in a method of assigning connection identifier in ATM switching system of the present invention without departing from the spirit or scope of the invention. Thus, it is intended that the present invention cover the modifications and variations of this invention provided they come within the scope of the is appended claims and their equivalents.

What is claimed is:

1. A method of assigning a connection identifier for an asynchronous transfer mode switching (ATM) system, said method comprising the steps of:

(a) analyzing a parameter transmitted in a received connection identifier allocation request, analyzing the number of connections in a subscriber interface module (SIM), and confirming a signalling mode between a subscriber and a network of the analyzed parameter is normal and a connection is available;

(b) calculating an index value for accessing a virtual path identifier (VPI) management table which stores a VPI usage state if the signalling mode is a coupled signalling mode in which only the same VPI as a VPI for signalling is used as a VPI for user data transmission, VPI or both VPI and virtual connection identifier (VCI) are designated in a connection identifier allocation request, and the VPI for signalling and the VPI for user data transmission are identical, to thereby check the usage stage of a detected VPI;

(c) designating the VPI for user data transmission as the VPI for signalling if the signalling mode is a decoupled signalling mode in which the VPI for signalling and other VPIs are available for the VPI for user data transmission, and the VPI or both VPI and VCI are not designated, and calculating the index value for accessing the VPI management table which stores the VPI usage state if there is no error in the designated VPI, to thereby check the usage state of the detected VPI;

(d) notifying a connection identifier allocation failure if the VPI is used for virtual path connection, notifying that the virtual path is already established if the VPI is used for a virtual channel, or analyzing the signalling mode if the VPI is not in use;

(e) indicating that the selected VPI is in use if the signalling mode is the decoupling mode and the number of VPI used does not surpass the number of VPI assigned to a connection identifier allocation number management table; and (f) indicating that the selected VPI is in use if the signalling mode is the coupling mode and a new VPI can be used.

2. The method as claimed in claim 1, further comprising the steps of:

(g) assigning the VCI in the VPI selected and indicating VPI/VCI assigned if the VCI is not designated when a connection identifier allocation is requested for the VCI; and (h) increasing the number of virtual channels assigned to the connection identifier allocation number management table and VPI management table if the VPI is designated in a the connection identifier allocation request and the selected VCI is not in use, storing a selected connection identifier in a VCI management table, and indicating the assigned connection identifier assigned.

3. The method as claimed in claim 2, wherein said step (g) comprises the substeps of:

(i) assigning the VCI in the selected VPI if the VCI is not designated for the connection identifier allocation request for VCI allocation, and analyzing the assigning result of VCI; and (j) indicating the connection identifier allocation failure if the VCI allocation is abnormal, and indicating VPI/VCI assigned if the VCI allocation is normal.

4. The method as claimed in claim 2, wherein said step (h) comprises the substeps of:

(i) confirming whether the designated VCI is in use if the VCI is designated when the connection identifier allocation request is made;

(j) indicating allocation impossibility if the VCI is in use, or increasing the number of virtual channel connections assigned in the connection identifier allocation number management table and the VPI management table if the VCI is not in use, storing the selected connection identifier in the VCI management table, and confirming a storage result; and (k) indicating connection identifier allocation impossibility if the storage result ends abnormally, or indicating the assigned connection identifier if the storage result is performed normally.

5. The method as claimed in claim 1, wherein said step (a) comprises the substeps of:

(g) analyzing parameters such as the SIM number, signalling mode designation information, signalling VPI transmitted in response to the received connection identifier allocation request (h) indicating connection identifier allocation impossibility if the parameter analysis result is abnormal, or analyzing the number of connections in SIM required to assign connection identifier by using the number of virtual path and virtual channel assigned of the connection identifier allocation number management table if the parameter analysis result is normal, to thereby find out whether the number of connections surpasses the number of permissible connections; and indicating connection identifier allocation impossibility if the number of connection is over the permissible number of connections, or analyzing the signalling mode between the subscriber and the network required when a virtual path number is selected when a connection identifier is assigned, if the number of connection is not over the number of premissible connections and thus connection is permissible.

6. The method as claimed in claim 1, wherein said step (b) comprises the substeps of:

(g) finding out whether a desired VPI or both VPI and VCI are designated in response to the connection identifier allocation request if the signalling mode is the coupling mode;

(h) designating a VPI for user information transmission as the same identifier as the signalling VPI if they are not designated, or finding out whether the VPI designated for signalling is identical with the VPI designated for user data transmission if the VPI or VCI is designated; and (i) indicating connection identifier allocation impossibility if the VPI for signalling is not identical with the VPI for user data transmission, or calculating the index value for accessing the VPI management table which stores the usage state of VPI if the VPI for signalling is identical with the VPI for user data transmission, to thereby check the usage state of the detected VPI.

7. The method as claimed in claim 1, wherein said step (c) comprises the substeps of:

(g) finding out whether a desired VPI or both VPI and VCI are designated in response to the connection identifier allocation request if the signalling mode is the coupling mode;

(h) designating a VPI for user information transmission as the same identifier as the signalling VPI and analyzing an error of the VPI designated for user information transmission if they are not designated, or analyzing an error of the VPI designated for user information transmission and deciding whether there is an error of the VPI if the VPI or VCI is designated; and (i) indicating connection identifier allocation failure if there is an error in the designated VPI, or calculating the index value for accessing the VPI management table which stores the usage state of VPI if there is no error in the designated VPI, to thereby check the usage state of the detected VPI.

8. The method as claimed in claim 1, wherein said step (e) comprises the substeps of:

(g) checking the number of VPI in use in SIM if the signalling mode is a non-associating mode;

(h) indicating that the selected VPI is in use if there is a permissible VPI according to the result of said step (g), or selecting one of VPI in use for virtual channel connection in SIM if the number of VPI in use surpasses a limit, to thereby analyze the selection result of VPI; and (i) indicating connection identifier allocation impossibility if the selection of VPI fails, or indicating a selection result of VPI if a selection of VPI succeeds.

9. The method as claimed in claim 1, wherein said step (f) comprises the substeps of:

(g) analyzing the number of VPI in use in SIM with reference to the number of VPI assigned in the connection identifier allocation number management table if the signalling mode is an associating mode; and (h) indicating connection identifier allocation impossibility when the new VPI is not allowed to be used, or increasing the number of VPI assigned in the connection identifier allocation number management table if the new VPI is allowed to be used, indicating that the VPI corresponding to the index value of the VPI management table is in use, designating an allocation format as the virtual channel, increasing the number of virtual channels assigned, changing a next assigned VCI number, and putting the VPI in use.

10. The method as claimed in claim 1, wherein the step of calculating the index value for accessing the VPI management table comprises the substeps of:

(1) determining whether or not the SIM number required to assign connection identifier is 0;

(2) storing 0 for a base index value if the SIM number if 0, determining the base index value with a value in which the maximum VPI of the subscriber link is added by 1 and then multiplied by the SIM number if the SIM number if not 0, calculating the index value by adding a VPI value required to calculate the index value to the base index value decide, and checking the range of the calculated index value; and (3) indicating an index error if the index value calculated is smaller than 0 but greater than the maximum index value set in table construction, or indicating the index value calculated if the index value calculated is greater than 0 but smaller than the maximum index value set in table construction.

11. The method as claimed in claim 2, wherein the step of assigning the VCI in the VPI selected comprises the substeps of:

(1) selecting a next VCI value stored in the VPI management table, and confirming the usage state of the VCI selected with reference to the VCI management table if the value of the VCI selected is within a predetermined range;

(2) increasing the number of virtual channel connections assigned of the connection identifier management table and VPI management table if the selected VCI is not in use, storing the selected VPI/VCI in the VCI management table, increasing the next selected VCI value stored in the VPI management table, and indicating the assigned VCI;

(3) increasing a next selected VCI value of the VPI management table in order to select a VCI usable in the selected VPI, if the VCI value selected is in use, performing said step (2) if the increased VCI value is not in use, or performing a process of selecting a usable VCI value by increasing the next selected VCI value of the VPI management table predetermined times if the increased VCI value is in use, or selecting as a VCI a value in which the index value for jumping to a next selected VCI is added to the next selected VCI when the selected VCI is in continuous use if the usable VCI is not selected despite repetitive selections, to thereby check whether the selected VCI surpasses the range of VCI; and (4) performing said step (3) if the selected VCI is smaller than the maximum VCI value of the VPI according to the result of said step (3), or repetitively performing said step (3) predetermined times while designating the VCI as an initial value if the selected VCI is greater than the maximum VCI value of the VPI, or indicating virtual channel identifier allocation failure if the usable VCI is not found despite repetitive performances.

12. The method as claimed in claim 11, wherein said step (1) comprises the substeps of:

(5) selecting the next VCI value stored in the VPI management table, to thereby check the range of the selected VCI; and (6) selecting 32 for the VCI value if the VCI value selected is smaller than 32 but greater than 65535, the maximum VCI value of the VPI, or confirming the usage state of the selected VCI value if the VCI value selected is greater than 32 but smaller than 65535, the maximum VCI value of the VPI.

13. The method as claimed in claim 11, wherein said step (2) comprises the substeps of:

(5) increasing the number of virtual channel connections assigned of the connection identifier allocation number management table and VPI management table, increasing VPI/VCI selected in the VCI management table, and analyzing a storage result; and (6) indicating VCI allocation failure if the storage result is abnormal, or increasing the next selected VCI value stored in the VPI management table if the storage result is normal, and indicating the assigned VCI.

14. The method as claimed in claim 11, wherein the step of confirming the usage state of the selected VCI comprises the substeps of:

(1) deciding whether the VPI/VCI selected is identical with the VPI/VCI corresponding to a VCI index value stored in a VCI management table;

(2) indicating that the VCI selected is in use if they are identical, or deciding whether the value stored in the VCI management table is a final tuple not in use if the VPI/VCI selected is identical with the VPI/VCI corresponding to the VCI index value stored in the VCI management table in order to compare it with a next index value; and (3) repetitively performing said step (1) by increasing the index value by 1 if not a final tuple in said step (2), or indicating that the VCI selected is usable if the value stored in the VCI management table is a final tuple.

15. The method as claimed in claim 14, wherein whether or not the value stored in a VCI management table is the final tuple is decided by storing −1 in VPI/VCI not in use.

16. The method as claimed in claim 11, wherein the step of storing the VPI/VCI selected in the VCI table comprises the substeps of:

(1) determining whether the VPI and VCI of the VCI management table is a final tuple or not; and (2) repetitively performing said step (1) by increasing the index value if the final tuple is not determined in said step (1), or storing VPI/VCI selected in a buffer of the VCI management table if the final tuple is determined in said step (1), and indicating that the VPI/VCI selected is completely input.

17. The method as claimed in claim 16, wherein whether the value of said step (1) is the final tuple or not is decided by storing −1 in VPI/VCI not in use.

18. The method as claimed in claim 13, wherein the configuration of the connection identifier allocation number management table comprises:

an SIM number having one byte of integer;

a number of VPI assigned to SIM, having a value between 0 and 127 from one byte of integer;

a number of virtual path connection assigned to SIM, having a value between 0 and 127 from one byte of integer; and a number of virtual channel connection assigned to SIM, having a value between 0 and 511 from one byte of integer.

19. The method as claimed in claim 13, wherein the configuration of the VPI management table comprises:

an index key having four bytes and calculated with SIM number×the range of maximum VPI in (SIM+VPI number to be assigned);

the VPI usage state, said state being in use if the value is FALSE in Boolean type, said state being not in use if the value is TRUE;

a connection form having one byte of set type, indicating when the information being stored for VP indicates a virtual path, and when VC indicates the virtual channel;

a number of virtual channel connections assigned to VPI of SIM, having a value between 0 and 511 from one byte of integer; and a number of VCI to be next assigned in VPI, having four bytes between 32 and 65535.

20. The method as claimed in claim 13, wherein the configuration of the VCI management table comprises:

an SIM number, having one byte of integer;

the VPI assigned for virtual channel connection, having two bytes between 0 and 255; and the VCI of the VPI assigned for virtual channel connection, having four bytes between 32 and 65535.

21. A method of assigning a connection identifier for an asynchronous transfer mode switching system, said method comprising the steps of:

(a) analyzing a parameter transmitted in a received VPI allocation request, analyzing the number of connections and the number of VPI used in a subscriber interface module (SIM), and confirming whether a VPI desired to be used in VPI allocation request if the input parameter is normal and connection is available;

(b) changing a usage state of VPI assigned to a VPI management table if the VPI is designated and is not in use, increasing the number of VPI and the number of VPI assigned in a connection identifier management table, indicating an assigned VPI, or selecting a VPI not in use in SIM if the VPI is not designated with reference to the VPI management table, and changing the usage state of the VPI assigned in the VPI management table.

22. The method as claimed in claim 21, further comprising the steps of:

(g) assigning a VCI in the VPI selected if the VCI is not designated in the VCI identifier allocation request, and indicating the assigned VPI/VCI; and (h) increasing the number of virtual channels assigned in the connection identifier allocation number management table and VPI management table if the VCI is designated and not in use in the connection identifier allocation request, storing the connection identifier selected in the VCI management table, and indicating the assigned connection identifier.

23. The method as claimed in claim 22, wherein said step (g) comprises the step of:
   (i) assigning the VCI of the selected VPI if the VCI is not designated in the VCI allocation request, and analyzing an allocation result of the VCI; and
   (j) indicating connection identifier allocation failure if the VCI allocation is abnormal, or indicating VPI/VCI assigned if the VCI allocation is normal.

24. The method as claimed in claim 22, wherein said step (h) comprises the substeps of:
   (i) confirming whether or not a designated VCI is in use if it is designated in the connection identifier allocation request;
   (j) indicating allocation impossibility if the VCI is in use, or increasing the number of virtual channel connections assigned in the connection identifier allocation number management table and VPI management table if the VCI is not in use, storing the selected connection identifier in the VCI management table, and confirming a storage result; and
   (k) indicating connection identifier allocation impossibility if the storage ends abnormally, or indicating the connection identifier assigned if storage is performed normally.

25. The method as claimed in claim 22, wherein the step of assigning the VCI in the selected VPI comprises the substeps of:
   (1) selecting a next VCI value stored in the VPI management table, and confirming a usage state of the selected VCI with reference to a VCI management table if the value of the selected VCI is within a predetermined range;
   (2) increasing the number of virtual channel connection assigned of the connection identifier allocation number management table and VPI management table if the selected the VCI is not in use, storing the selected VPI/VCI in a VCI management table, increasing the next selected VCI value stored in the VPI management table, and indicating the assigned VCI;
   (3) increasing the next selected VCI value of the VPI management table in order to select a VCI usable in the selected VPI, if the selected VCI value is in use, performing said step (2) if the increased VCI value is not in use, or performing a process of selecting a usable VCI value by increasing the next selected VCI value of the VPI management table a predetermined number of times if the increased VCI value is in use, or selecting as a VCI, a value in which an index value for jumping to the next selected VCI is added to the next selected VCI when the VCI selected is in continuous use if the usable VCI is not selected despite repetitive selections, to thereby check whether the selected VCI surpasses the predetermined range of VCI; and
   (4) performing said step (3) if the selected VCI is smaller than the maximum VCI value of the VPI according to the result of said step (3), or repetitively performing said step (3) the predetermined number of times while designating the VCI as an initial value if the selected VCI is greater than the maximum VCI value of the VPI, or indicating virtual channel identifier allocation failure if the usable VCI is not found despite repetitive performances.

26. The method as claimed in claim 25, wherein said step (1) comprises the substeps of:
   (5) selecting the next VCI value stored in the VPI management table, to thereby check the range of the selected VCI; and
   (6) selecting 32 for the VCI value if the selected VCI value is smaller than 32 or greater than 65535, the maximum VCI value of the VPI, or confirming the usage state of the VCI value selected if the selected VCI value is greater than 32 but smaller than 65535, the maximum VCI value of the VPI.

27. The method as claimed in claim 25, wherein said step (2) comprises the substeps of:
   (5) increasing the number of virtual channel connection assigned of the connection identifier allocation number management table and VPI management table, increasing VPI/VCI selected in the VCI management table, and analyzing a storage result; and
   (6) indicating VCI allocation failure if the storage result is abnormal, or increasing the next selected VCI value stored in the VPI management table if the storage result is normal, and indicating the assigned VCI.

28. The method as claimed in claim 25, wherein the step of confirming a usage state of the VCI selected comprises the substeps of:
   (1) deciding whether the selected VPI/VCI is identical with the VPI/VCI corresponding to the VCI index value stored in the VCI management table;
   (2) indicating that the selected VCI is in use if they are identical, or determining whether the value stored in the VCI management table is a final tuple not in use if the selected VPI/VCI is identical with the VPI/VCI corresponding to the VCI index value stored in the VCI management table in order for comparison with a next index value; and
   (3) repetitively performing said step (1) by increasing the index value by 1 if the final tuple is not determined in said step (2), or indicating that the VCI selected is usable if the value stored in the VCI management table is determined to be the final tuple.

29. The method as claimed in claim 28, wherein whether the value stored in the VCI management table is the final tuple or not is decided by storing −1 in VPI/VCI not in use.

30. The method as claimed in claim 25, wherein the step of storing the VPI/VCI selected in a VCI table comprises the substeps of:
   (1) determining whether the VPI and VCI of the VCI management table is a final tuple or not; and
   (2) repetitively performing said step (1) by increasing the index value if the final tuple is not determined in said step (1), or storing VPI/VCI selected in a buffer of the VCI management table if the final tuple is determined in said step (1), and indicating that the VPI/VCI selected is completely input.

31. The method as claimed in claim 17, wherein whether the value of said step (1) is the final tuple or not is decided by storing −1 in VPI/VCI not in use.

* * * * *